US 11,556,141 B2

(12) United States Patent
Bork et al.

(10) Patent No.: US 11,556,141 B2
(45) Date of Patent: Jan. 17, 2023

(54) VALVE ARRANGEMENT

(71) Applicants: Festo SE & Co. KG, Esslingen (DE);
Festo Vertrieb GmbH & Co. KG,
Esslingen (DE)

(72) Inventors: Tilmann Bork, Berlin (DE); Bastian Behnke, Wangen (DE); Dominik Schubert, Ebersbach (DE); Hartmut Bulling, Böhmenkirch-Treffelhausen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/517,995

(22) Filed: Nov. 3, 2021

(65) Prior Publication Data

US 2022/0137652 A1    May 5, 2022

(30) Foreign Application Priority Data

Nov. 3, 2020    (DE) .......................... 102020213812.5

(51) Int. Cl.
*G05D 16/20*    (2006.01)
(52) U.S. Cl.
CPC ....... *G05D 16/204* (2013.01); *G05D 16/2022* (2019.01); *G05D 16/2024* (2019.01)
(58) Field of Classification Search
CPC ............. G05D 16/204; G05D 16/2022; G05D 16/2024
See application file for complete search history.

(56) References Cited

U.S. PATENT DOCUMENTS

| 4,372,193 | A  | * | 2/1983 | Hall ........................ | F15B 11/02 |
| | | | | | 91/518 |
| 7,165,397 | B2 | * | 1/2007 | Raszga .................. | F15B 11/166 |
| | | | | | 60/431 |
| 8,794,123 | B2 | * | 8/2014 | Bento .................... | F15B 20/001 |
| | | | | | 91/466 |

FOREIGN PATENT DOCUMENTS

| DE | 102017009374 A1 | 4/2019 |
| DE | 102019211992 A1 | 2/2021 |

* cited by examiner

*Primary Examiner* — Eric Keasel
(74) *Attorney, Agent, or Firm* — Hoffmann & Baron, LLP

(57) ABSTRACT

Valve arrangement for influencing a fluid flow for a fluid consumer, having a first valve group with which a first actuator is associated, having a second valve group with which a second actuator is associated, the first valve group and second valve group being associated in a first functional position as a parallel circuit with a first fluid line in a first functional position and are associated with a second fluid line in a second functional position as a series circuit, the first valve group or second valve group being designed for actuating the respective other actuator in the first functional position and being designed for switching off the respective other actuator in the second functional position.

10 Claims, 2 Drawing Sheets

VALVE ARRANGEMENT

BACKGROUND OF THE INVENTION

The invention relates to a valve arrangement for influencing a fluid flow for a fluid consumer.

SUMMARY OF THE INVENTION

The task of the invention is to provide a valve arrangement for influencing a fluid flow for a fluid consumer, with which safe operation of a fluid consumer designed as an actuator for providing a movement can be ensured.

This task is solved for a valve arrangement with the following features: the valve arrangement has a supply inlet, a vent outlet and a consumer connection and further comprises a first valve group having a first control valve and a first consumer valve, wherein the first valve group is connected with a first actuator, which first actuator has a first control signal terminal and a first pilot air terminal and which is designed for switching both the first control valve and the first consumer valve between a first functional position and a second functional position in case a control signal is provided at the first control signal terminal and a pilot pressure is provided at the first pilot air terminal; the valve arrangement further comprises a second valve group having a second control valve and a second consumer valve, wherein the second valve group is connected with a second actuator, which second actuator has a second control signal terminal and a second pilot air terminal and which is designed for switching both the second control valve and the second consumer valve between a first functional position and a second functional position in case a control signal is provided at the second control signal terminal and a pilot pressure is provided at the second pilot air terminal, wherein the first consumer valve and the second consumer valve being in the first functional position form a parallel connection within a first fluid line which extends between the consumer connection and the vent outlet, wherein the first consumer valve and the second consumer valve being in the second functional position form a series connection within a second fluid line which extends between the supply inlet and the consumer connection, wherein the second control valve being in the first functional position provides a pilot pressure to a first pilot pressure line, which is connected to the first pilot air terminal, and being in the second functional position switches off the pilot pressure in the first pilot pressure line, wherein the first control valve being in the first functional position provides a pilot pressure to a second pilot pressure line which is connected to the second pilot air terminal and being in the second functional position switches off the pilot pressure in the second pilot pressure line.

By way of example, the valve arrangement can be constructed from discrete individual components which are connected to one another by fluidic connecting lines, in particular fluid hoses. Purely by way of example, the individual components are standard products of the applicant. Alternatively, it can be provided that the valve arrangement is designed as an integrated assembly in which the control valves, the consumer valves, the actuators as well as the fluid channels required for connecting the valves are arranged in a common body.

In particular, it can be provided that the first control valve and/or the first consumer valve, depending on the respective functional position, have a fluidic connection to supply ports and/or output ports of the first valve group, which are connected in the other functional position with the first consumer valve or the first control valve.

The supply inlet is designed for connection to a fluid source, in particular a compressed air source. At the supply inlet, compressed air is provided for the valves of the valve arrangement. The vent outlet is used for fluid discharge of pressurized fluid, which has been provided to the fluid consumer, into the environment or into a suitable fluid reservoir. For example the vent outlet can be provided with a silencer. The consumer connection is used to connect the valve assembly to a fluid consumer, which may be, for example, a pneumatic cylinder or a rotary actuator or a pneumatic muscle or other valves.

The valve arrangement comprises a first valve group, which has a first control valve and a first consumer valve and with which a first actuator is associated, which has a first control signal terminal and a first pilot air terminal and which is designed for switching the first control valve and the first consumer valve between a first functional position and a second functional position in the presence of a control signal at the first control signal terminal and a pilot pressure at the first pilot air terminal.

The function of the first control valve is to divert a portion of the compressed air provided at the supply inlet as pilot air to the first actuator as a function of a switching position of the first control valve.

The first actuator is set up to perform an actuation, in particular a fluidic actuation, of the first control valve and the first consumer valve when a pilot pressure provided by the pilot air and a control signal, which can be an electrical signal or a fluidic signal, are simultaneously present at the first pilot air terminal and the first control signal terminal, respectively. The actuation which is effected by these conditions results in a changeover of the first control valve and the first consumer valve from the first functional position to the second functional position. The actuator may be referred to as a pilot valve, which, when the control signal is present, provides the pilot pressure to the first control valve and to the first consumer valve to achieve their switching from the first functional position to the second functional position.

Preferably, it is provided that the second valve arrangement is designed identically with the first valve arrangement and can thus be operated in the same way as the first valve arrangement.

For the fulfillment of safety requirements, which are used as a basis for the operation of the fluid consumer to be controlled by the valve arrangement, it is provided that the fluid consumer can also be transferred to a safe state when a first fault occurs. By way of example, an interruption of the compressed air supply is regarded as a safe state for the fluid consumer. For example, a first fault may be that a valve, which is intended to influence the fluidic connection between a compressed air source and the fluid consumer, has a malfunction. The malfunction may be that the valve does not react to an appropriate control signal or the malfunction may be that the valve does not return from the open position to a closed position as a reaction to a corresponding control signal or to a deactivation of the control signal, and thus the safe state for the fluid consumer is not achieved.

In order to ensure a safe mode of operation for the fluid consumers with the aid of the valve arrangement, several measures are provided by whose interaction the valve arrangement ensures a reliable disconnection of the fluidic connection between the supply inlet and the consumer connection even if a first fault occurs.

A first measure is that the first consumer valve and the second consumer valve are fluidically interconnected in such a way that they form a parallel circuit in the first functional position, in which venting of the fluid consumer is to be ensured, so that an outflow of compressed air from the fluid consumer, which is connected to the consumer connection, to the vent outlet can take place by at least one of the first consumer valve and the second consumer valve. Accordingly, there is mutual independence between the operation of the first consumer valve and the operation of the second consumer valve for the venting of the fluid consumer.

A second measure is that the first consumer valve and the second consumer valve are fluidically interconnected in such a way that they form a series connection in the second functional position to provide compressed air from the supply inlet to the consumer connection. Thus, only when both the first consumer valve and the second consumer valve are switched from the first functional position to the second functional position, a fluidic connection between the supply inlet and the consumer connection is released. If, on the other hand, only one of the two consumer valves is switched from the first functional position to the second functional position, while the other consumer valve remains in the first functional position, for example due to a fault, the fluidic connection between the supply inlet and the consumer connection is not established. Accordingly, for the fluid supply of the fluid consumer, there is a dependency between the operability of the first consumer valve and the operability of the second consumer valve.

A third measure is that the second control valve is configured in the first functional position for providing a pilot pressure to a first pilot pressure line connected to the first pilot air terminal and in the second functional position for shutting off the pilot pressure in the first pilot pressure line, wherein the first control valve is configured in the first functional position for providing a pilot pressure to a second pilot pressure line connected to the second pilot air terminal and in the second functional position for shutting off the pilot pressure in the second pilot pressure line. The pneumatic coupling between the second control valve and the first actuator ensures that the first actuator can only effect a switchover of the first control valve and the first consumer valve between the first functional position and the second functional position if the second control valve is still in the first functional position. If, on the other hand, the second control valve has left the first functional position, the configuration of the second control valve ensures that the pilot pressure in the first pilot pressure line is switched off. In particular, it can be provided that the first pilot pressure line is vented in the second functional position of the second control valve. In the same way, this applies to the first control valve, which influences the pilot pressure in the second pilot pressure line depending on its respective functional position.

It is expedient if the first control valve and the first consumer valve are positively coupled and/or if the second control valve and the second consumer valve are positively coupled. This positive coupling between the respective control valve and the respective consumer valve ensures that the switchover between the two functional positions for the respective control valve and the consumer valve, which is forcedly coupled thereto, takes place synchronously. Exemplarily, it is provided that the control valve and the consumer valve are realized in a common valve housing and comprise a common valve member, for example a valve spool, which effects the respective blocking or unblocking of a control channel associated with the control valve and a consumer channel associated with the consumer valve.

In one embodiment of the invention, it is provided that a first consumer pressure line is connected to a first portion of the fluid line extending between the first consumer valve and the second consumer valve, the first consumer pressure line being connected to the first pilot air terminal, and/or that a second consumer pressure line is connected to a second portion of the fluid line extending between the second consumer valve and the consumer connection, the second consumer pressure line being connected to the second pilot air terminal.

The function of the first consumer pressure line is to ensure a supply of pilot air to the first pilot air terminal, provided that the first consumer valve is in the second functional position, whereby pressurization of the first section of the fluid line extending between the first consumer valve and the second consumer valve occurs. The compressed air provided in this first section of the fluid line can be used to supply the first actuator with pilot air via the associated consumer pressure line, so that this causes the first control valve and the first consumer valve to remain in the second functional position under the additional condition of the presence of a control signal at the first control signal terminal. Hereby, a self-holding of the second functional position for the first valve arrangement is made possible until the first control signal is switched off.

The function of the second consumer pressure line is to ensure a supply of pilot air to the second pilot air terminal, provided that the first consumer valve and the second consumer valve are in the second functional position and thus, due to the series connection of the first consumer valve and the second consumer valve to be taken into account here, a supply of the second section of the fluid line, which extends between the first consumer valve and the second consumer valve, takes place. With the compressed air provided in this second section of the fluid line, the second actuator can be supplied with pilot air via the associated consumer pressure line, so that, under the additional condition of the presence of a control signal at the second control signal terminal, this causes the second control valve and second consumer valve to remain in the second functional position. This makes it possible for the second valve group to remain in the second functional position until the second control signal is switched off and provided that the first valve group also remains in the second functional position.

Advantageously, an output port of a first shuttle valve is connected to the first pilot air terminal and the first pilot pressure line and the first consumer pressure line are connected to a respective associated input port of the first shuttle valve and/or an output port of a second shuttle valve is connected to the second pilot air terminal and the second pilot pressure line and the second consumer pressure line are connected to a respective associated input port of the second shuttle valve. The task of the first and second shuttle valve is to provide the respective higher pressure level in the first pilot pressure line or in the first consumer pressure line to the first pilot air terminal and/or to provide the higher pressure level in the second pilot pressure line or in the second consumer pressure line to the second pilot air terminal. Furthermore, the shuttle valve prevents the pilot air provided at the respective pilot air terminal from flowing into the line in which a lower pressure level is present.

Preferably, a first check valve connected to a second supply port of the first valve group and to a second output port of the first valve group is arranged in parallel with the first consumer valve in the blocking direction relative to the second supply port and/or a second check valve connected to a second supply port of the second valve group and to a second output port of the second valve group is arranged in parallel with the second consumer valve in the blocking direction relative to the second supply port. The task of the first check valve and the second check valve is to ensure reliable venting of the fluid consumer even if the first valve group and/or the second valve group could not be completely switched from the second functional position to the first functional position.

It is expedient if the first control valve in the second functional position is designed for a connection of the first pilot pressure line to the vent outlet and/or that the second control valve in the second functional position is designed for a connection of the second pilot pressure line to the vent outlet. This ensures that the first pilot pressure line is vented as soon as the second control valve is switched to the second functional position and that the second pilot pressure line is vented as soon as the first control valve is switched to the second functional position. By way of example, this ensures that the second valve group can no longer be transferred from the first functional position to the second functional position if the first valve group has already been transferred from the first functional position to the second functional position, since the first control valve in the second functional position vents the second control line and thus for the second actuator one of the two absolutely necessary prerequisites for the changeover of the second valve group, namely the presence of a sufficient pilot pressure at the second pilot air terminal and the presence of a control signal at the second control signal terminal, is not fulfilled. In the same way, this also applies to the switching of the first valve group from the first functional position to the second functional position, which is only possible if both the required pilot pressure and the required control signal are present at the first actuator.

According to a further embodiment of the invention, it is provided that a first choke is formed in the first pilot pressure line and/or that a second choke is formed in the second pilot pressure line. The task of the first choke is to slow down a pressure reduction in the first pilot pressure line, provided that the second control valve has already been switched from the first functional position, in which compressed air can be provided to the first pilot pressure line, to the second functional position, in which venting of the first pilot pressure line is provided. The task of the second choke is to slow down a pressure reduction in the second pilot pressure line, provided that the first control valve has already been switched from the first functional position, in which compressed air can be supplied to the second pilot pressure line, to the second functional position, in which venting of the second pilot pressure line is provided. The first choke and the second choke thus increase a time span within which one of the two valve groups can still be switched over from the first functional position to the second functional position if the respective other valve group has already been switched over from the first functional position to the second functional position.

In a further embodiment of the invention, it is provided that the first valve group is designed as a fluidically pilot-controlled 5/2-way valve biased into the first functional position and that the first actuator is designed as a pilot solenoid valve and/or that the second valve group is designed as a fluidically pilot-controlled 5/2-way valve biased into the first functional position and that the second actuator is designed as a pilot solenoid valve. The design of the actuator as a pilot solenoid valve defines the requirements which are necessary for switching the first valve group and the second valve group from the first functional position to the second functional position. These requirements are both the provision of an electrical control signal so that the pilot solenoid valve can be switched from a blocking position to a release position, and the provision of the pilot air to the pilot solenoid valve which is required to switch a valve member, in particular a valve spool, of the 5/2-way valve from the first functional position to the second functional position. Herewith the valve member is biased, for example by means of a biased spiral spring, into the first functional position and is moved into the second functional position by the pilot pressure, provided that the pilot solenoid valve has assumed its release position.

In an advantageous further development of the invention, it is provided that a first standard switching time of the first valve group for a switchover between the first functional position and the second functional position is selected to be smaller than a venting time for the first pilot pressure line and/or that a second standard switching time of the second valve group for a switchover between the first functional position and the second functional position is selected to be smaller than a venting time for the second pilot pressure line. A standard switching time of the respective first valve group and second valve group is to be understood as that time duration which the respective first valve group/second valve group requires for switching over between the first functional position and the second functional position when functioning properly. This is based on the longest period of time required by the respective first valve group/second valve group within its intended range of use. The venting time for the respective pilot pressure line is determined by the intended pilot pressure and, in particular, by the line cross-sections of the pilot pressure line, the choke and the control valve. For a reliable function of the valve arrangement, it is provided that the pilot pressure in the pilot pressure line after the switchover of the respective first valve group/second valve group from the first functional position to the second functional position within the standard switching time for the respective other first valve group/second valve group is still at a level which still allows the switchover of the other first valve group/second valve group, despite the venting of the associated pilot pressure line taking place.

The task of the invention is also solved by a valve arrangement for influencing a fluid flow for a fluid consumer, which has two valve groups, each of which has an electrically actuable pilot valve and each of which has a main valve which can be actuated fluidically by the respective pilot valve, the main valves each being designed to be switchable between a first switching position and a second switching position and each having a switchable consumer branch and each having a switchable control branch, the main valves being coupled in such a manner that in the first switching position the consumer branches form a parallel circuit for venting the fluid consumer and in the second switching position they form a series circuit for pressurizing the fluid consumer, each pilot valve being assigned a shuttle valve which is connected to an output of the control branch of the respective other main valve and to an output of the consumer branch of its own main valve in order to ensure mutual blocking of the first valve group and the second valve group when a predetermined difference between switching times of the first valve group and the second valve group is exceeded.

Here, the electrically controllable pilot valve corresponds to the actuator explained above and can, for example, be designed as a pilot solenoid valve. The main valve that can be actuated fluidically by the respective pilot valve corresponds to the force-coupled combination of the control valve and the consumer valve explained above and can be designed in particular as a 5/2-way valve. The switchable consumer branch corresponds to the optional connection, controlled by the two consumer valves, between the supply inlet and the working port or the working port and the vent outlet. The switchable control branch corresponds in each case to the connection, which can be influenced by the respective control valve, between the supply inlet, the respective pilot pressure line and the vent outlet. The mutual blocking of the first valve group and the second valve group when a predetermined difference between switching times of the first valve group and the second valve group is exceeded is achieved by the pilot pressure for switching one, for example the second valve group from the first functional position to the second functional position being provided by the other, for example the first valve group only until the other, for example first valve group has left the first functional position. As soon as the other valve group, for example the first valve group, has reached the second functional position, the venting of the control branch of the one valve group, for example the second valve group begins, so that its switching from the first to the second functional position can only take place as long as there is sufficient pilot pressure. If the one valve group, for example second valve group, cannot be switched from the first functional position to the second functional position within the intended timeframe within which there is still sufficient pilot pressure, then subsequently automated switching is no longer possible because the required pilot pressure is no longer present. In this case, manual user intervention can then be provided, for example, in particular by a manual override of the first valve group and/or the second valve group.

BRIEF DESCRIPTION OF THE DRAWINGS

An advantageous embodiment of the invention is shown in the drawing. Here shows.

DETAILED DESCRIPTION

Figure 1:
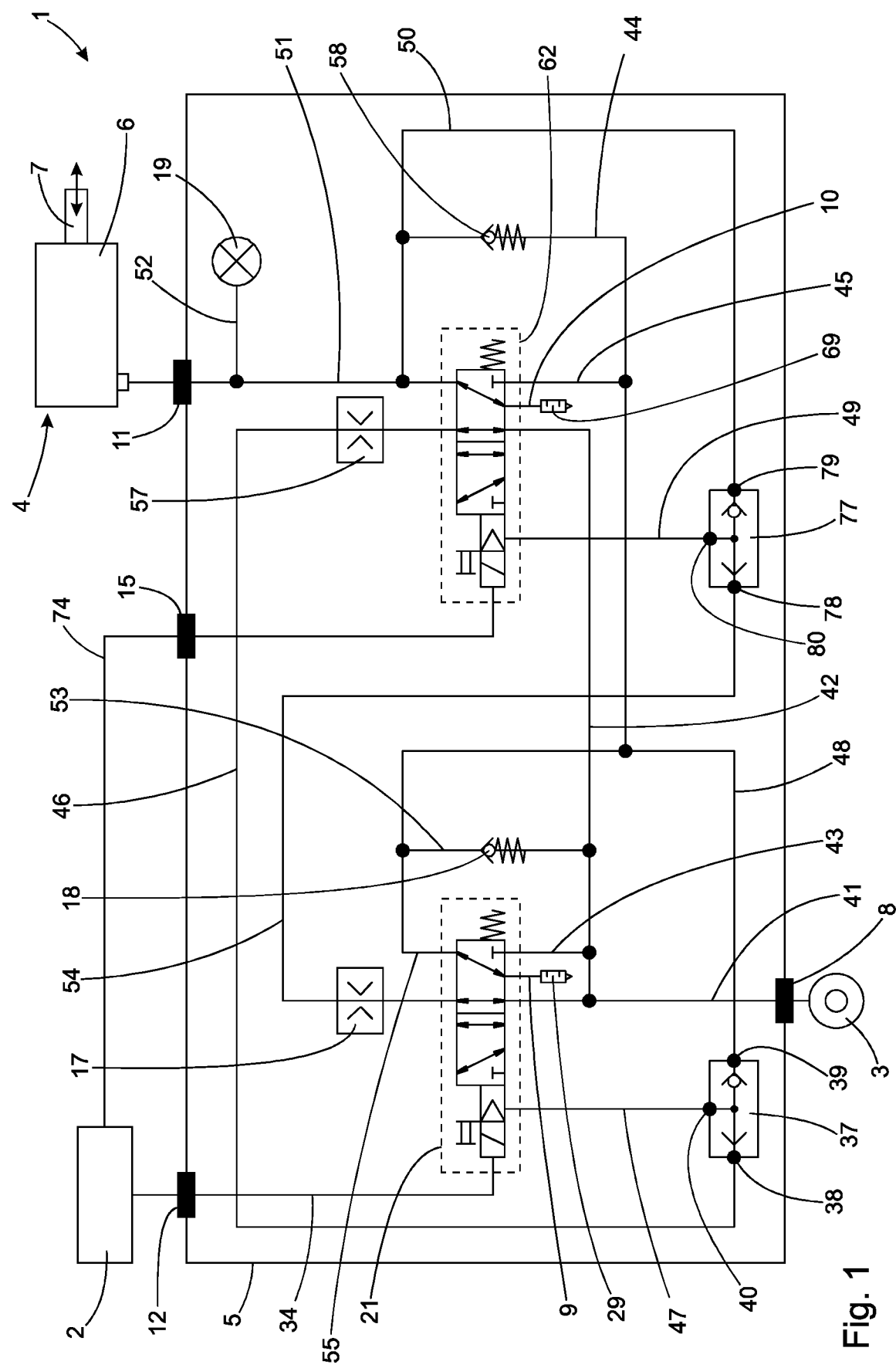
FIG. 1 a strictly schematic representation of a fluid system with a control, a fluid source, a fluid consumer and a valve arrangement, and FIG. 2 a detailed representation of the valve arrangement according to FIG. 1.

A fluid system 1 shown in FIG. 1 comprises a control 2, a fluid source 3, a fluid consumer 4 and a valve arrangement 5. The control 2 can be designed, for example, as a programmable logic controller, which can be connected to a higher-level machine control system. The task of the control 2 is to control the valve arrangement 5 so that the valve arrangement 5 can effect a supply of compressed air to the fluid consumer 4, which is designed as a single-acting pneumatic cylinder, and further can effect a discharge of compressed air from the fluid consumer 4. The fluid consumer 4 comprises a cylinder housing 6, in which a linearly movable working piston is accommodated, which piston is connected to a piston rod 7, which protrudes from the cylinder housing 6, so that the fluid consumer is designed for providing a linear movement. The energy required for a movement of the working piston and the piston rod 7 connected thereto is provided by the fluid source 3, which provides this energy in the form of compressed air to the valve arrangement 5.

The valve arrangement 5 comprises a supply inlet 8 which is connected to the fluid source 3, a first vent outlet 9, a second vent outlet 10 and a consumer connection 11 which is connected to the fluid consumer 4. Furthermore, the valve arrangement 5 comprises a first control signal terminal 12 and a second control signal terminal 15, which are provided for feeding control signals of the control 2 into the valve arrangement 5.

The valve arrangement 5 may, for example, be made of discrete components, each having its own housing and being interconnected by fluid hoses. Alternatively, it may be provided that the components of the valve arrangement 5 are integrated in a common base body and are fluidically coupled to each other by means of suitable bores in the base body.

For the following description of the valve arrangement 5 on the basis of the schematic representation of the single figure, the construction method is not important; the functions described can be realized both with discrete construction methods and with integrated construction methods or mixed forms thereof.

The valve arrangement 5 has a first valve group 21, which is designed as an electrically actuated and fluidically pilot-controlled 5/2-way valve. Furthermore, the valve arrangement 5 has a second valve group 61, which is designed identically to the first valve group 21 and is therefore not described separately. All of the following elements of the first valve group 21 are provided in the same way in the second valve group 61 and are provided with reference signs, which are provided with numerals increased by 40 compared to the first valve group 21, as can be seen from the illustration of FIG. 2.

The first valve group 21 can be functionally subdivided into a first control valve 22 and a first consumer valve 23, wherein the first control valve 22 has the task of providing and interrupting a pilot air supply, while the first consumer valve 23 is used for providing and interrupting of a compressed air supply to the fluid consumer 4.

Figure 2:
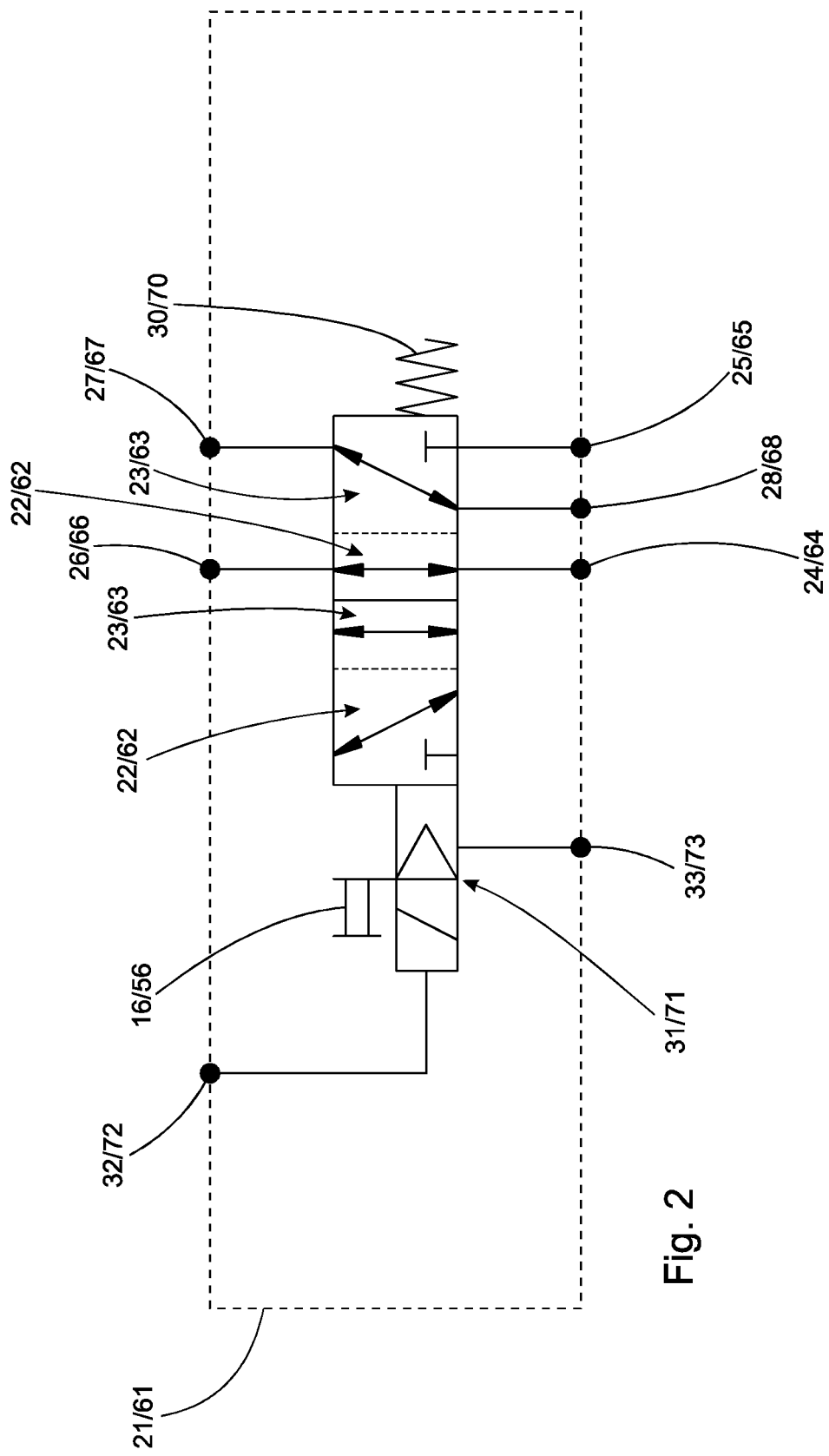

The first valve group 21 has a total of five ports, which are shown in more detail in FIG. 2. Exemplarily, the first valve group 21 has a first supply port 24, a second supply port 25, a first output port 26, a second output port 27 and a vent port 28. In the practical implementation of the first control valve 22 and the first consumer valve 23, a switching position-dependent use of the ports 24 to 28 by the first control valve 22 and the first consumer valve 23 is provided at least in part. This means, for example, that the first control valve 22, which is switched or held in the first functional position fluidically connects the first supply port 24 to the first output port 26 in a communicating manner. Furthermore the first consumer valve 23, which is switched in the first functional position, fluidically connects the second output port 27 to the vent port 28 in a communicating manner and blocks the second supply port 25, as shown in FIGS. 1 and 2. Furthermore, in a purely exemplary manner, it is provided that the first control valve 22 in the second functional position blocks the first supply port 24 and fluidically communicates the first output port 26 with the vent port 28, while the first consumer valve 23 in the second functional position fluidically communicates the second supply port 25 with the second output port 27.

In addition, the first valve group 21 is equipped, purely by way of example, with a first manual override 16, which enables manual actuation of the first valve group 21 by a user, whereby in particular a transfer of the first valve group 21 from the first functional position according to the representation of FIGS. 1 and 2 to a second functional position not shown can be carried out hereby.

The first supply connection 24 is connected to the supply inlet 8 via a line 41, which, like all the other lines 42 to 54 described below, can take the form of a fluid hose or a bore in a base body, by way of example. A line 42 branches off from the line 41 and is connected to the first supply port 64 of the second valve group 61. Further, a line 43 branches off from the line 42 and is connected to the second supply port 24. A line 54 is connected to the first output port 26 of the first valve group 21, which is connected to a first input port 78 of a second shuttle valve 77. A first choke 17 is arranged in the line 54, which can be formed, for example, as a discrete component or as a bore with a defined cross-section in a base body. The first choke 17 ensures a restriction of a fluid volume flow that can flow through the conduit 54. A conduit 48 is connected to the second output port 27, which is connected to a second input port 93 of a first shuttle valve 37. A conduit 44 is connected to the conduit 48, which is connected to the second supply port 65 of the second valve group 61 via a conduit 45.

At the exhaust port 28 of the first valve group 21 and in the same manner at the exhaust port 68, silencers 29 and 69 are arranged, respectively, which enable a silenced discharge of compressed air into an environment of the fluid system 1.

The first valve group 21 has a first actuator 31, on which a first control signal terminal and a first pilot air terminal are provided. The first actuator 31 can be designed, by way of example, as an electrically actuated solenoid valve which, in the presence of an electrical control signal which can be provided by the control 2 via a first signal line 34, and in the presence of a pilot pressure at the first pilot air terminal 33, can cause the first control valve 22 and the first consumer valve 23 to switch between a first functional position shown in FIG. 1 and a second functional position not shown. The first actuator 31 may also be referred to as a first pilot valve. The combination of the first control valve 22 and the first consumer valve 23 may also be referred to as a fluidically pilot operated first main valve. Exemplarily, this first main valve is designed as a spool valve, in which a forced motion coupling between the first control valve 22 and the first consumer valve 23 is ensured due to the design of the valve spool, which is not shown in more detail.

Starting from the first output port 66 of the second valve group 61, a line 46 extends to a first input port 38 of the first shuttle valve 37. A second choke 57 is looped into the line 46, which performs the same function as the first choke 17. An output port 40 of the first shuttle valve 37 is connected to the first pilot air terminal 33 of the first actuator 31. The first shuttle valve 37 is configured such that the higher pressure applied to one of the two input ports 38, 39 is always provided to the first pilot air terminal 33.

A line 51 is connected to the second output port 67 of the second valve group 61, which is connected to the consumer connection 11. A line 50 branches off from the line 51, which is connected to the second input port 79 of the second shuttle valve 77. Furthermore, a line 52 branches off from the line 51, which is connected to a pneumatic signal transmitter 19, which can be designed, for example, in the manner of a pressure indicator and provides a user with information as to whether a supply pressure is present in the line 51 or whether this is not the case. The output port 80 of the second shuttle valve 77 is connected to the second pilot air terminal 73 of the second actuator 71.

Furthermore, a line 53 extends between the line 42 and the line 48, into which a first spring-biased check valve 18 is looped, which is connected in fluidic parallel to the first consumer valve 23. The first check valve 18 is arranged in the blocking direction with respect to the second outlet port 27 of the first valve group 21. A second check valve 50 is looped into a line 44 extending between the second supply port 65 and the second output port 67, thereby causing the second check valve 58 to be connected in parallel with the second consumer valve 63. Thereby, the second check valve 58 is arranged in blocking direction with respect to the second output port 67.

A mode of operation of the valve arrangement 5 can be described as follows: first, the fluid system 1 is in the initial position as shown in FIG. 1. Both the first valve group 21 and the second valve group 61 are in the first functional position, in which they are held by the action of a biasing spring 30, 70, respectively, shown only schematically as long as no action of the respective actuator 31 resp. 71 causes a changeover of the respective first valve group 21 or second valve group 61. The supply pressure provided by the fluid source 3 is applied to the first supply port 24 and the second supply port 25 of the first valve group 21 as well as to the first supply port 64 of the second valve group 61. The first control valve 22 is in the release position, so that the supply pressure is also present at the first output port 26 and, via line 54, also at the first input port 78 of the second shuttle valve 77. Since only the ambient pressure is present at the second input port 79 of the first shuttle valve 77, since the line 50 is vented via the second consumer valve 63, the supply pressure is also available at the second pilot air terminal 73 of the second actuator 71. The supply pressure provided at the first supply port 64 of the second valve group 61 is provided to the first output port 68 due to the release position of the second control valve 62, and from there via the line 46 to the first input port 38 of the first shuttle valve 37. Since there is a connection to the vent port 28 of the first valve group 21 at the second input port 39 of the first shuttle valve via the line 48, it is ensured that the supply pressure is also applied to the first pilot air terminal 33.

When electrical control signals are provided to the first signal line 34 and the second signal line 74, the first actuator 31 and the second actuator 71 can respectively cause the associated first and second control valves 22, 62 to be switched and as a result the first and second consumer valves 23, 63 which are positively coupled to the first and second control valves 22, 62, respectively to be switched.

First, the case where both the first valve group 21 and the second valve group 61 are fully operable is considered. The switchover of the first valve group 21 is substantially simultaneous with the switchover of the second valve group 61, wherein the pilot air provided by the first valve group 21 in its first functional position to the second actuator 71 is used to switch the second control valve 62 and the second consumer valve 63 during the synchronous switchover of the two valves 21, 61. Since the switchover of the first valve group 21 to the second functional position results in the interruption of the pilot air supply from the first control valve 22 to the second actuator 71, it is thus imperative that the second valve group 61 is switched over within the same standard switching time to as the first valve group 21, since otherwise the pilot air is no longer available to carry out the switchover process from the first functional position to the second functional position. In the same way, this applies to the changeover of the first valve group 21 whose first actuator 31 is actuated by the second control valve 62.

As soon as the respective valve group 21, 61 has reached the second functional position, it can hold this functional position without the intervention of the respective other first valve group 21 or second valve group 61, since the first and second control valves 22, 62, are configured in such a way that in the second functional position, when the supply pressure is present at the consumer connection 11, they supply the pilot air for the respective own actuator 31 or 71 itself and independently of the respective other first valve group 21 or second valve group 61.

The respective first valve group 21 and/or second valve group 61 is/are reset in the event that the respective control signal is switched off at the associated actuator 31, 71. In this case, the fluidically pilot-controlled main valve, which respectively controls the first control valve 22 and the first consumer valve 23 or the second control valve 62 and the second consumer valve 63, is returned to the first functional position due to the restoring effect of the respective pretensioning spring 30, 70. Hereby, on the one hand, the fluidic connection between the supply inlet 8 and the respective actuator 31, 71 is re-established via the control valve 62, 22 associated with the respective other first valve group 61 or second valve group 21, so that a new switching operation is made possible. In addition, venting of the consumer connection 11 and of the fluid consumer 4 connected thereto takes place via the respective consumer valves 23, 63, so that the fluid consumer 4 reaches a safe state.

If, on the other hand, a time delay occurs between a switchover of the first valve group 21 and the second valve group 61 during the provision of the electrical control signals to the first actuator 31 and the second actuator 71, the case arises that possibly one of the first valve group 21 or second valve group 61 actually reaches the second functional position while the other of the first valve group 21 or second valve group 61 can no longer reach the second functional position, since its actuator 31, 71 is cut off from the pilot air supply, which in the first functional position is taken over by the respective other first valve group 21 or second valve group 61, since the other first valve group 21 or second valve group 61 has already reached the second functional position and thus the associated first control valve 22 or 62 performs the venting of the respective other actuator 31, 71, without the respective first valve group 21 or second valve group 61 already having been able to take over its own supply to the actuator 31, 71, since the second functional position has not been reached. In this case, it is ensured that no supply of the fluid consumer takes place due to the malfunction of one of the first valve group 21 or second valve group 61, which malfunction may merely be a delayed reaction to the actuator by the respective actuator 31, 71. In this case, for example, a manual release must be made by an operator, for example by manual actuation of the first valve group 21 or second valve group 61, which has not yet reached the second functional position. In this case, however, the one of first valve group 21 or second valve group 61 that could not be switched from the first to the second functional position within the standard switching time to is usually replaced.

If, on the other hand, a malfunction of one of the two valves occurs during the shutdown of the fluid consumer 4, whereby this malfunction can consist in particular in the fact that one of the first valve group 21 or second valve group 61 cannot be transferred from the second functional position into the first functional position despite appropriate control of the actuator 31, 71, it is nevertheless ensured that the pressure supply of the fluid consumer 4 is interrupted by the respective first valve group 21 or second valve group 61 and the venting of the fluid consumer 4 takes place, since the first consumer valve 23 and the second consumer valve 63 are connected in parallel in the first functional position, which is equivalent to a venting position for the fluid consumer 4, so that it is sufficient if only one of the first valve group 21 or second valve group 61 can be switched over from the second functional position to the first functional position.

If the fault at one of the first valve group 21 or second valve group 61 has not been noticed during the changeover from the second functional position to the first functional position, the function of the respective first and second control valves 22, 62 will in any case prevent the fluid consumer 4 from being switched on again. This is due to the fact that the first valve group 21 or second valve group 61 which could not be switched over from the second functional position to the first functional position does not provide a pilot air supply for the actuator 31, 71 of the respective other first valve group 21 or second valve group 61, so that this also prevents the respective other first valve group 21 or second valve group 61 from being switched over from the first functional position to the second functional position.

Thus, the mutual provision of the pilot air in the first functional position as well as the disconnection of the pilot air supply for the respective other first valve group 21 or to second valve group 61 ensures that a changeover of the first valve group 21 or second valve group 61 can only take place synchronously. Furthermore, the series connection of the consumer valves 23, 63 in the second functional position and the parallel connection of the two consumer valves 23, 63 in the first functional position ensure that the respective function is provided redundantly in each case.

What is claimed is:
1. A valve arrangement, comprising a supply inlet, a vent outlet and a consumer connection, further comprising a first valve group which comprises a first control valve and a first consumer valve and to which a first actuator is assigned, which first actuator has a first control signal terminal and a first pilot air terminal for switching the first control valve and the first consumer valve between a first functional position and a second functional position in the presence of a control signal at the first control signal terminal and in the presence of a pilot pressure at the first pilot air terminal, further comprising a second valve group, which comprises a second control valve and a second consumer valve and to which a second actuator is associated, which second actuator has a second control signal terminal and a second pilot air terminal for switching the second control valve and the second consumer valve between a first functional position and a second functional position in the presence of a control signal at the second control signal terminal and in the presence of a pilot pressure at the second pilot air terminal, wherein the first consumer valve and the second consumer valve establish a parallel connection within a first fluid line which extends between the consumer connection and the vent outlet in the first functional position and wherein the first consumer valve and the second consumer valve establish a series connection within a second fluid line which is extended between the supply inlet and the consumer connection in the second functional position, wherein the second control valve provides in the first functional position a pilot pressure to a first pilot pressure line connected to the first pilot air terminal and provides in the second functional position a shutting off for the pilot pressure in the first pilot pressure line, wherein the first control valve provides a pilot pressure to a second pilot pressure line in the first functional position, which second pilot pressure line is connected to the second pilot air terminal, and wherein the first control valve switches off the pilot pressure in the second pilot pressure line in the second functional position.

2. The valve arrangement according to claim 1, wherein the first control valve and the first consumer valve are positively coupled and/or wherein the second control valve and the second consumer valve are designed to be positively coupled.

3. The valve arrangement according to claim 1, wherein a first consumer pressure line is connected to a first section of the fluid line, which first section of the fluid line extends between the first consumer valve and the second consumer valve, which first consumer pressure line is connected to the first pilot air terminal and/or wherein a second consumer pressure line is connected to a second section of the fluid line, which second section extends between the second consumer valve and the consumer connection, which second consumer pressure line is connected to the second pilot air terminal.

4. The valve arrangement according to claim 3, wherein an outlet port of a first shuttle valve is connected to the first pilot air terminal and wherein the first pilot pressure line and the first consumer pressure line are connected to a respectively associated inlet port of the first shuttle valve and/or that an output port of a second shuttle valve is connected to the second pilot air terminal and that the second pilot pressure line and the second consumer pressure line are connected to a respectively associated input port of the second shuttle valve.

5. The valve arrangement according to claim 1, wherein a first check valve connected to a second supply connection of the first valve group and to a second output connection of the first valve group is arranged in parallel with the first consumer valve in the blocking direction with respect to the second supply connection and/or wherein a second check valve, which is connected to a second supply connection of the second valve group and to a second output connection of the second valve group, is arranged in the blocking direction with respect to the second supply connection in parallel with the second consumer valve.

6. The valve arrangement according to claim 1, wherein the first control valve which is switched in the second functional position provides a connection of the first pilot pressure line with the vent outlet and/or wherein the second control valve switched in the second functional position provides a connection of the second pilot pressure line with the vent outlet.

7. The valve arrangement according to claim 1, wherein a first choke is located in the first pilot pressure line and/or wherein a second choke is located in the second pilot pressure line.

8. The valve arrangement according to claim 1, wherein the first valve group is a fluidically pilot-controlled 5/2-way valve which is biased into the first functional position, and wherein the first actuator is a pilot-control solenoid valve, and/or wherein the second valve group is a fluidically pilot-controlled 5/2-way valve which is biased into the first functional position, and wherein the second actuator is a pilot-control solenoid valve.

9. The valve arrangement according to claim 1, wherein a first standard switching time of the first valve group for a switchover between the first functional position and the second functional position is smaller than a venting time for the first pilot pressure line and/or wherein a second standard switching time of the second valve group for a switchover between the first functional position and the second functional position is smaller than a venting time for the second pilot pressure line.

10. A valve arrangement for influencing a fluid flow for a fluid consumer, having two valves which each have an electrically actuable pilot valve and which each have a main valve which can be actuated fluidically by the respective pilot valve, the main valves are switchable between a first switching position and a second switching position and having a switchable consumer branch and a switchable control branch, the main valves being coupled in such a way that the consumer branches form a parallel circuit for venting the fluid consumer in the first switching position and form a series circuit for pressurizing the fluid consumer in the second switching position, each pilot valve being assigned a shuttle valve which is connected to an output of the control branch of the respective other main valve and to an output of the consumer branch of its own main valve in order to ensure mutual blocking of the first valve group or second valve group when a predetermined difference between switching times of the first valve group and the second valve group is exceeded.

* * * * *